United States Patent
Tanner et al.

(10) Patent No.: US 6,290,848 B1
(45) Date of Patent: *Sep. 18, 2001

(54) FILTER CARTRIDGE FOR GRAVITY-FED WATER TREATMENT DEVICES

(75) Inventors: John D. Tanner; David J. Emmons, both of Plymouth, MN (US)

(73) Assignee: PUR Water Purification Products, Inc., Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,458

(22) Filed: Apr. 16, 1997

(51) Int. Cl.[7] ................................................. B01D 24/100
(52) U.S. Cl. ............................................. 210/266; 210/282
(58) Field of Search ..................................... 210/264, 282, 210/484, 493.1, 493.2, 493.5, 497.01, 502.1, 509, 266

(56) References Cited

U.S. PATENT DOCUMENTS

| | | |
|---|---|---|
| 3,246,767 * | 4/1966 | Pall . |
| 3,327,859 * | 6/1967 | Pall . |
| 3,493,117 * | 2/1970 | Tuffnell et al. ....................... 210/282 |
| 3,972,694 | 8/1976 | Head ..................................... 210/505 |
| 4,026,792 | 5/1977 | Orth, Jr. ................................ 210/40 |
| 4,102,736 | 7/1978 | Head et al. ........................... 162/104 |
| 4,212,743 * | 7/1980 | van Meter et al. ................... 210/282 |
| 4,753,728 * | 6/1988 | Vanderbilt et al. .................. 210/282 |
| 4,828,698 * | 5/1989 | Jewell . |
| 4,969,996 | 11/1990 | Hankammer ......................... 210/282 |
| 5,013,438 * | 5/1991 | Smith ................................ 210/493.1 |
| 5,106,500 | 4/1992 | Hembree et al. ..................... 210/266 |
| 5,128,034 | 7/1992 | Kool ..................................... 210/232 |
| 5,139,666 | 8/1992 | Charbonneau et al. ............. 210/264 |
| 5,225,078 | 7/1993 | Polasky et al. ....................... 210/264 |
| 5,232,595 | 8/1993 | Meyer ................................ 210/493.1 |
| 5,268,093 | 12/1993 | Hembree et al. ..................... 210/136 |
| 5,277,802 | 1/1994 | Goodwin .............................. 210/202 |
| 5,536,394 | 7/1996 | Lund et al. ............................. 210/87 |
| 5,579,808 * | 12/1996 | Mikol . |
| 5,612,224 * | 3/1997 | O'Brien . |
| 5,731,081 * | 3/1998 | Esu . |
| 5,755,963 * | 5/1998 | Sugiura et al. .................... 210/493.1 |
| 5,895,763 * | 4/1999 | Edstrand . |
| 6,182,453 * | 2/2001 | Forsberg . |

FOREIGN PATENT DOCUMENTS

| | | |
|---|---|---|
| 2 233 002 | 10/1973 | (DE) . |
| 0 236 071 | 9/1987 | (EP) . |
| WO 84/04050 | 10/1984 | (WO) . |

OTHER PUBLICATIONS

Product Literature for PureIt Water Filtration System from WTC Ecomaster Corporation (Minneapolis, Minnesota) (copyright 1995).

Product Literature for PŪR Hiker and PŪR Pioneer from Recovery Engineering, Inc. (Minneapolis, Minnesota) (on sale prior to Apr. 16, 1996).

Three color photographs of PŪR Pioneer from Recovery Engineering, Inc. (Minneapolis, Minnesota) (on sale prior to Apr. 16, 1996).

Product Literature for Pour–Thru Water Filter Pitcher System from Teledyne Water Pik (published prior to Apr. 16, 1997).

(List continued on next page.)

Primary Examiner—Chester T. Barry
(74) Attorney, Agent, or Firm—Merchant & Gould P.C.

(57) ABSTRACT

A filter cartridge for a gravity-fed water treatment device having a porous particulate filter disposed therein. The porous particulate filter has an open upper end, a closed lower end, and sidewalls therebetween. Water is treated as it flows through the sidewalls of the filter. The cartridge also contains granular media disposed within the porous particulate filter.

30 Claims, 1 Drawing Sheet

OTHER PUBLICATIONS

*Scientific Products*, a catalog, pp. 914–916, 920, 922, 924, 928 (1994/1995 catalog).
*The Fisher Catalog,* pp. 725–728, 731–736 (published prior to Apr. 16, 1997).
Cole Parmer Catalog, 1995–1996, pp. ii–iii, 356–357, 362–363.

Product Literature for PŪR Water Microfilter, Recovery Engineering, Inc., (copyright 1993).

Cross–sectional figure of Water Microfilter shown in above PŪR product literature.

* cited by examiner

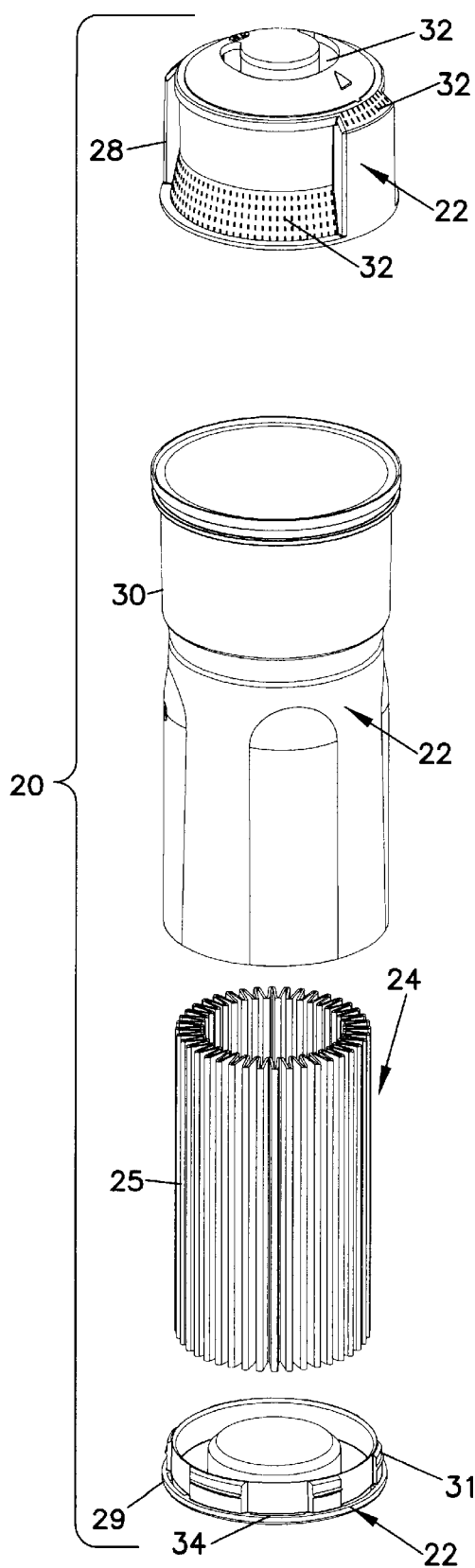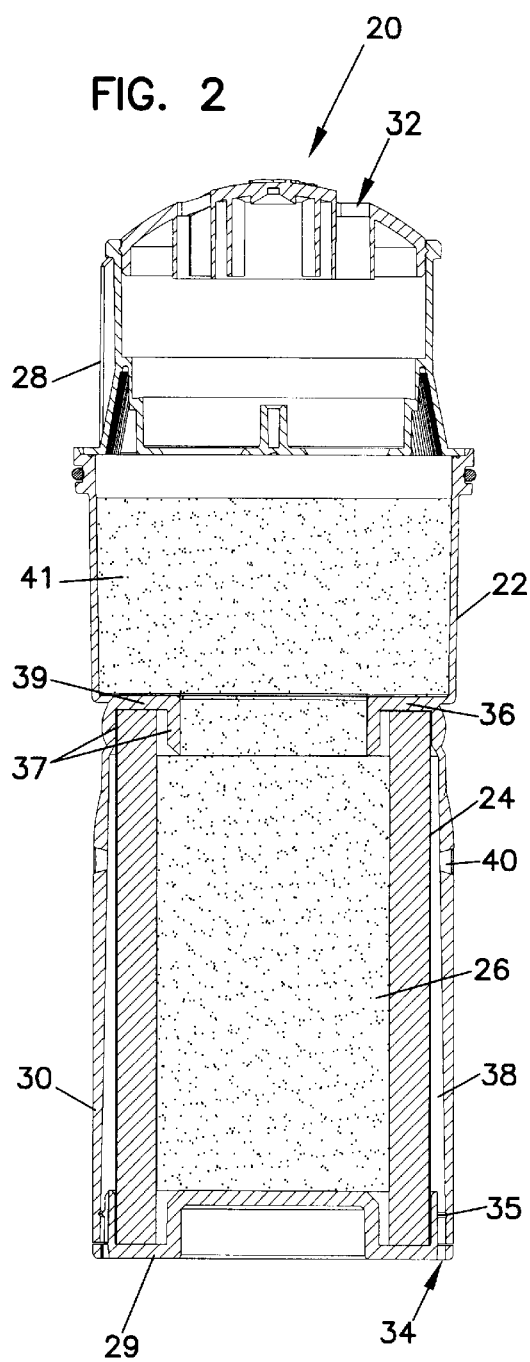

US 6,290,848 B1

FILTER CARTRIDGE FOR GRAVITY-FED WATER TREATMENT DEVICES

FIELD OF THE INVENTION

This invention relates to filter cartridges for use in gravity-fed water treatment systems. In particular, this invention relates to a filter cartridge having novel filter media.

BACKGROUND OF THE INVENTION

Domestic water treatment devices are known in the art. Among these devices are self-contained systems which process water in batches. Examples of batch devices are pitchers/carafes and larger reservoirs where treated water is poured, for example, from a spigot. These self-contained systems typically have upper and lower chambers separated by a filter cartridge. They rely on gravity to force water from the upper chamber, through the cartridge, and into the lower chamber, thereby producing treated water.

The presence of unwanted and potentially harmful contaminants in water, especially drinking water, is of concern to many people. This concern creates a desire for water treatment devices in the home and elsewhere. Many water treatment devices and methods have been developed to remove or neutralize chemical and particulate contaminants. Some of these devices and methods incorporate chemically active materials to treat the water. For example, activated carbon is capable of removing the bad taste and odor from water as well as chlorine and other reactive chemicals. Ion exchange resins are useful for removing metal and other ions from water. However, no single material or chemical has been found that will remove all contaminants.

In addition to chemical and particulate contaminants, water often contains biological contaminants. These contaminants often can not be entirely removed by activated carbon, ion exchange resins, or other chemically active water purifiers. The biological contaminants may be susceptible to harsher chemical treatment, but such chemicals are, typically, themselves contaminants or can not be easily incorporated in gravity-fed treatment devices, especially those for household use. In addition to being resistant to removal by standard chemical means, many of these biological contaminants, such as protozoan cysts like cryptosporidium, are only a few microns in size.

Because of their small size and the relative unavailability of suitable chemical removal methods for these biological contaminants, a gravity-fed water treatment device which can remove protozoan cysts and still retain satisfactory flow rate has been very difficult to develop. Present devices which filter cysts out of water require pressurization, either from the tap or by manual pumping, to achieve a satisfactory flow rate. However, such devices are relatively complex and expensive, and in the case of manual pressurization systems, harder to operate. Thus, there is a need for a gravity-fed water treatment device that is capable of removing biological contaminants, including cysts like cryptosporidium, while providing an acceptable flow rate.

SUMMARY OF THE INVENTION

According to the present invention, a filter cartridge for a gravity-fed water treatment is provided. In one aspect of the invention, the filter cartridge includes a porous particulate filter that has an open upper end, a closed lower end, and sidewalls between the two ends. The porous particulate filter is sealed to a portion of the filter cartridge by a connecting member. Water is treated as the water flows into the open upper end and through the sidewalls of the porous particulate filter. Air within the filter, that is displaced by incoming water, flows out of the open upper end of the filter.

In another aspect of invention, the filter cartridge includes a porous particulate filter with sidewalls and an inlet. Granular media is contained within the sidewalls of the filter. Water is treated as it flows through the inlet of the filter, through the granular media, and radially outward through the sidewalls of the filter.

In a further aspect of the invention, the filter cartridge includes a porous particulate filter which includes glass fibers and a hydrophilic binder. The porous particulate filter is sealed to a portion of the filter cartridge by a connecting member. Water that is treated by the filter cartridge has greater than 99.95% of 3–5 micron cysts particles removed.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

BRIEF DESCRIPTION OF THE DRAWINGS

A preferred embodiment of the present invention will be described with reference to the accompanying drawings, wherein like reference numerals identify corresponding parts:

FIG. 1 is an exploded perspective view of an embodiment of a filter cartridge according to the present invention; and FIG. 2 is a partial cross-sectional view of the filter cartridge shown in FIG. 1.

DETAILED DESCRIPTION OF THE PREFERRED EMBODIMENT

The filter cartridge 20 described herein can be used in a variety of gravity-fed water treatment devices. Referring to FIGS. 1 and 2, this preferred embodiment of the filter cartridge 20 contains a porous particulate filter 24 with granular media 26 disposed within particulate filter 24. Filter cartridge 20 also has a shell 22 which surrounds porous particulate filter 24 to provide mechanical support for the particulate filter. Shell 22 has a collar 36 which seals porous particulate filter 24 to cartridge 20 so that water flowing through the cartridge must pass through porous particulate filter 24 and is, thereby, treated.

Porous particulate filter 24 mechanically filters particles and biological contaminants, such as protozoan cysts, out of the water. To effectively filter biological contaminants, porous particulate filter 24 should have pores smaller than the size of the contaminants that are to be filtered. Biological cysts, such as cryptosporidium, are only a few microns in size. An effective cryptosporidium filter must have pores that are less than about 5 microns, and preferably less than about 2 microns, in diameter. Thus, porous particulate filter 24 is, preferably, microporous, which means that the particulate filter has pores which are approximately 1–3 microns or smaller in size.

Preferably porous particulate filter 24 removes greater than 99.95% of 3–4 micron cysts particles from water treated with the filter cartridge. The level of cyst filtration is determined using the protocols of NSF 53 §6.5 and 6.12, incorporated herein by reference. The most relevant parts of these protocols are reproduced. NSF Protocol 53 §6.5.1 reads:

6.5.1 Cysts reduction

The system shall reduce the number of 3- to 4- micrometer particles from an influent challenge level of at least $5\times10^4$ particles per milliliter by at least 99.95% when tested in accordance with 6.12.

NSF Protocol 53 §6.12.3–4 and §6.12.10 read:

| 6.12.3 General test water | |
| --- | --- |
| hardness (as $CaCO_3$) | no more than 170 mg/L |
| pH | 7.5 ± 0.5 |
| temperature | 20° C. ± 2.5° C. (68° F. ± 5° F.) |
| total dissolved solids (TDS) | 200–500 mg/L |
| turbidity | <1 NTU |

6.12.4 Influent challenge—cyst

Fine test dust or latex beads shall be added to the challenge water specified in 6.12.3 to achieve 50000 ($5\times10^4$) particles/mL of 3- to 4-micrometers and a turbidity of greater than 10 NTU. The test dust shall have a nominal 0- to 5-micrometer size classification and shall have 96% (by volume %) of its particles within this range and 20% to 40% (by volume %) of its particles greater than 2.5 micrometers.

6.12.10 Method—Batch treatment systems—cyst reduction

Two systems shall be conditioned by completely filling the raw water reservoir with the general test water specified in 6.12.3. The systems shall be tested using the challenge water in 6.12.4. The water shall be allowed to filter until it reaches its natural level in the raw and treated water reservoirs. A filling cycle shall be established based on the time required for one half the water to filter through the initial cycle. The filling schedules shall be maintained 16 hours per day followed by an 8-hour rest period. The systems shall be filled completely each time with a measured volume. Treated water shall be discarded as necessary.

Porous particulate filter 24 is preferably formed in a shape having sidewalls 25 and an open upper end. Sidewalls 25 of porous particulate filter 24 are substantially cylindrical. However, other shapes of the sidewalls are also included within the scope of the invention. Moreover, sidewalls 25 of particulate filter 24 may be flat or pleated, as shown in FIG. 1. Pleated sidewalls provide greater filter surface area than do flat sidewalls for an otherwise identical filter configuration. However, the pleats should not be closely spaced or the flow rate through the pleats will be decreased.

The upper end of particulate filter 24 is at least partially open so that water can flow into particulate filter 24 and air within particulate filter 24 can escape as it is displaced by the water. The bottom end of porous particulate filter may be closed (not shown) or open (see FIGS. 1 and 2). If the bottom end is open then porous particulate filter 24 should be attached to an object, such as a bottom cap 29 of shell 22, which will prevent the flow of water out of the open bottom end of particulate filter 24.

Porous particulate filter 24 can be formed from a wide variety of materials. Preferably, sidewalls 25 of porous particulate filter 24 are made from a hydrophilic, microporous filter media. Optionally, if the bottom end of porous particulate filter 24 is closed, then the bottom can also be made from the hydrophilic, microporous filter media. One example of a suitable hydrophilic, microporous filter media is a carbon block which has been hollowed out to create sidewalls and a open upper end.

The preferred hydrophilic, microporous filter media for the construction of porous particulate filter 24 is fibrous sheet filter media. The fibers of this sheet filter media can be either natural, such as fiber made of cellulose or cellulose derivatives, or synthetic, such as fibers made from polymers or glass. Preferably, the fibers are synthetic fibers, and more preferably, the fibers are glass microfibers. Often natural fibers, such as cellulose fibers, are thicker than synthetic fibers resulting in fewer pores and a correspondingly slower flow rate.

The flow rate of water through a given porous particulate filter is of critical importance in determining the acceptability of porous particulate filter 24 for a gravity-fed water treatment device. Flow rate is typically determined by the size of the pores, the pressure applied to the water to push it through the pores, and the composition of the filter. In gravity-fed devices, such as carafes or household water storage containers, the pressure exerted on water to push it through filter cartridge 20 is due only to a gravitational force on the water itself. For household gravity-fed water treatment devices, such as carafes, the pressure exerted on the water is typically less than about 0.5 $lb/in^2$. Consequently, the gravity-induced flow rate through a typical microporous particulate filter is very slow and not practical for a gravity-fed water treatment device.

To overcome this limitation, the preferred porous particulate filters 24 of the invention contain hydrophilic material. Hydrophilic materials, as defined for purposes of the present invention, are those materials, which when dry, are quickly wetted (i.e., they absorb droplets of water quickly). The hydrophilicity of these materials is due to an attractive force between the hydrophilic material and water which is greater than the surface tension of the water at the water/filter interface (i.e. the attractive force between the individual water molecules at the interface).

The hydrophilicity of porous particulate filter 24 may be a result of the hydrophilic nature of the fibers or other material of the porous particulate filter. Alternatively, the hydrophilicity of the filter may be due to an additive to the material of the filter. Such an additive may be capable of creating a hydrophilic particulate filter even if the filter contains non-hydrophilic or hydrophobic fibers.

A hydrophilic additive to the filter may also serve other functions within the filter material. One example of such an additive is a hydrophilic binder which is added to the media, not only to impart hydrophilicity to the fibers, but also to bind the microfibers of the media together to form a sheet. Hydrophilic sheet filter media having these properties is available from Alhstrom, Mont. Holly Springs, Pa. (Grade 2194-235). Suitable hydrophilic binder for use in binding glass microfibers is available from Goodrich (Part No. 26450).

Sheet filter media was obtained from the above-named source. The sheet filter media had an average pore size of about 1.2 µm and a thickness of about 0.024 in. The porous particulate filter was about 3 in. tall and had a 1.75 in. outer diameter. The porous particulate filter was pleated to give 40 pleats uniformly spaced around the filter with a pleat depth of about 0.25 in., giving the filter an inner diameter of 1.25 in.

To protect porous particulate filter 24 from damage, a shell 22 may be disposed around filter 24. Shell 22 has three connectable pieces, a top cap 28, a bottom cap 29, and a body 30, as shown in FIGS. 1 and 2. This configuration allows for easy placement of particulate filter 24 in filter cartridge 20. Other shell configurations may be used and are included within the scope of the invention.

Shell 22 also has one or more inlet apertures 32 and one or more outlet apertures 34 through which water enters and exits filter cartridge 20, respectively. Inlet apertures 32 are positioned in an upper portion of shell 22 in either top cap 28 (see FIGS. 1 and 2) or an upper portion of body 30 (not shown).

Outlet apertures 34 are typically located in the bottom cap 29, but could also be on the side of body 30. Inlet apertures 32 and outlet apertures 34 are positioned within shell 22 so that water flowing into inlet apertures 32 goes through granular media 26 and porous particulate filter 24 prior to exiting out outlet apertures 34.

Porous particulate filter 24 is adhesively connected to bottom cap 29 to provide a seal to prevent water from flowing around the bottom of filter 24. Bottom cap 29 also contains one or more ridged columns 31 which, when bottom cap 29 is slid into body 30, will contact a lip of an indentation 35 in the interior portion of body 30 to firmly hold cap 29 in place. There are spaces between ridged columns 31 of cap 29 to allow water to flow out of filter cartridge 20 through outlet apertures 34 in bottom cap 29.

Shell 22 also has a collar 36 acting as a connecting member, which provides a seal between porous particulate filter 24 and filter cartridge 20 so that water flowing through inlet apertures 32 must pass through porous particulate filter 24 before exiting through outlet apertures 34. Collar 36 has an annular cup formed by a cylinder 37 and a base 39. Porous particulate filter 24 is adhesively attached within the annular cup formed by cylinder 37 and base 39 to provide a water-tight connection to collar 36. Other methods of sealing porous particulate filter 24 to cartridge 20 are also included within the scope of the invention.

Shell 22 is typically constructed of a plastic or polymeric material. Shell 22 is preferably made from a molded plastic.

The flow rate of water through porous particulate filter 24 is often diminished by the presence of air adjacent to porous particulate filter 24. Air trapped near particulate filter 24 forms an interface with the water in particulate filter 24. There will be a surface tension associated with this interface. Unless there is enough pressure to break this surface tension, the water will not flow. Thus, it is desirable that there be a path for the escape of air as it is displaced by water flowing into filter cartridge 20. One advantage of the filter configuration depicted in FIGS. 1 and 2 is that air in the interior of the shape formed by porous particulate filter 24 can flow out the open upper end of porous particulate filter 24 and exit filter cartridge 20 through inlet apertures 32.

When shell 22 is provided around porous particulate filter 24, air may also be trapped in gap 38 between shell 22 and particulate filter 24. The presence of trapped air may reduce the flow rate through filter 24 as the water level within gap 38 rises.

Air outlet apertures 40 are provided in shell 22 so that the air can escape from gap 38, especially when outlet apertures 34 are below the water level of the water treatment device. Air outlet apertures 40 are often provided near the upper end of gap 38 which is proximate the sealed connection between shell 22 and porous particulate filter 24. This configuration will allow most or all of the air to escape the cartridge as air will naturally rise to the highest possible level due to the buoyancy of air in water. In addition to providing an escape path for air, air outlet apertures 38 may also function as water outlet apertures.

Granular media 26 is typically disposed within shell 22 to provide additional water purification. As shown in FIG. 2, granular media 26 is preferably disposed within porous particulate filter 24. This configuration is advantageous because particulate filter 24 will prevent granular media 26 from coming out of filter cartridge 20. In addition, granular media can be disposed within a separate granular media containment region 41 of shell 22 (see FIG. 2).

Granular media 26 comprises chemicals or materials that are suitable for treating water. Granular media 26 typically includes chemicals or other materials that are capable of removing, reducing, or deactivating one or more of the following elements: bad odor, bad taste, organic contaminants, chemical contaminants, and metal or other unwanted ions, such as chlorine. Suitable granular media 26 includes carbon, zeolites, an ion exchange resin, or a combination thereof. A preferred form of carbon for use as granular media is granular activated carbon. A preferred granular media for use in the filter cartridges of the invention is a mixture of a weak-acid cation exchange resin and granular activated carbon.

In one embodiment of the invention, at least a portion of granular media 26 is hydrophilic. Hydrophilic granular media includes granular activated carbon. A hydrophilic granular media disposed within porous particulate filter 24 may facilitate the flow of water through porous particulate filter 24. Hydrophilic granular media in contact with porous particulate filter 24 may provide a less resistive flow path for water into and through the (preferably hydrophilic) sidewalls 25 of porous particulate filter 24.

It should be understood that the present invention is not limited to the preferred embodiment described above, which is illustrative only. Changes may be made in detail, especially matters of shape, size, arrangement of parts, or materials of components within the principles of the invention to the full extent indicated by the broad general meanings of the terms in which the appended claims are expressed.

We claim:

1. A filter cartridge for a gravity-fed water treatment device, comprising:

a hydrophilic porous particulate filter having an open upper end, a lower end, and sidewalls therebetween, the hydrophilic porous particulate filter defining an interior volume free from porous particulate filter media;

granular filter media disposed in the interior volume; and a connecting member sealing said hydrophilic porous particulate filter to a portion of the filter cartridge proximate said upper end of said filter;

wherein the filter cartridge is configured and arranged to establish, with a pressure of about 0.5 lb/in$^2$, more than an insubstantial flow rate to allow water to flow by force of gravity through said open upper end, into said interior volume, and through said sidewalls of said hydrophilic porous particulate filter.

2. The filter cartridge of claim 1, wherein the sidewalls of the porous particulate filter are substantially cylindrical.

3. The filter cartridge of claim 1, wherein the porous particulate filter is microporous.

4. The filter cartridge of claim 1, wherein the porous particulate filter comprises sheet filter media.

5. The filter cartridge of claim 1, wherein the porous particulate filter is pleated.

6. The filter cartridge of claim 1, wherein the filter cartridge further comprises a shell having an inlet and an outlet, the shell being disposed around the porous particulate filter, wherein water is treated as it flows from the inlet of the shell, into the open upper end of the porous particulate filter, through the sidewalls of the filter, and out the outlet of the shell.

7. The filter cartridge of claim 6, wherein the shell further comprises one or more air-outlet apertures so that, when water enters the cartridge through the inlet of the shell, air is also displaced out of the air-outlet apertures of the shell.

8. A filter for a gravity-fed water treatment device, comprising:

a porous particulate filter having an inlet and sidewalls defining an interior volume; and granular media disposed throughout the interior volume that extends between opposing sides of the porous particulate filter;

said porous particulate filter and said granular media being constructed and arranged such that water flows by force of gravity into said inlet, through said granular media, and radially outward through said sidewalls of said porous particulate filter as it is treated.

9. The filter of claim 8, wherein the porous particulate filter comprises sheet filter media.

10. The filter of claim 8, wherein the sidewalls of the porous particulate filter are substantially cylindrical.

11. The filter of claim 8, wherein the porous particulate filter is pleated.

12. The filter of claim 8, wherein the porous particulate filter comprises hydrophilic material.

13. The filter of claim 8, wherein the porous particulate filter comprises glass microfibers.

14. The filter of claim 13, wherein the porous particulate filter further comprises a hydrophilic binder to hold the glass microfibers together.

15. The filter of claim 8, wherein the porous particulate filter is capable of removing protozoan cysts.

16. The filter of claim 8, wherein the porous particulate filter is microporous.

17. The filter of claim 8, wherein the granular media is carbon, an ion exchange resin, or a combination thereof.

18. The filter of claim 17, wherein the carbon in the granular media comprises granular activated carbon.

19. The filter of claim 8, wherein the granular media is hydrophilic.

20. A filter cartridge for a gravity-fed water treatment device, comprising:

a hydrophilic porous particulate filter having glass fibers and a hydrophilic binder to bind the fibers together, the filter being capable of removing greater than 99.95% of 3–4 micron cyst particles from water; and a connecting member sealing said porous particulate filter to a portion of the filter cartridge.

21. The filter cartridge of claim 20, wherein the glass fibers comprise glass microfibers.

22. The filter cartridge of claim 20, wherein the porous particulate filter has sidewalls.

23. The filter cartridge of claim 20, wherein the porous particulate filter is substantially cylindrical.

24. The filter cartridge of claim 20, wherein the porous particulate filter comprises sheet filter media.

25. The filter cartridge of claim 20, wherein the porous particulate filter is pleated.

26. A filter cartridge for a gravity-fed water treatment device, comprising:

a hydrophilic, porous particulate filter having sidewalls defining an interior volume, the sidewalls being configured and arranged to allow passage of water by the force of gravity, thereby treating the water;

granular filter media disposed in the interior volume; and a member sealingly connecting the filter to a portion of the filter cartridge, thereby separating untreated water from treated water.

27. The filter cartridge of claim 26, wherein the filter is shaped as a tube.

28. The filter cartridge of claim 26, wherein the member sealingly connects said filter proximate an upper end of the filter.

29. The filter cartridge of claim 26, wherein the member sealingly connects the filter proximate a lower end of the filter.

30. The filter cartridge of claim 26, wherein the member comprises an adhesive material.

* * * * *